(12) United States Patent
Uno

(10) Patent No.: US 10,649,434 B2
(45) Date of Patent: May 12, 2020

(54) NUMERICAL CONTROLLER

(71) Applicant: Fanuc Corporation, Minamitsuru-gun, Yamanashi (JP)

(72) Inventor: Kousuke Uno, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 24 days.

(21) Appl. No.: 15/935,575

(22) Filed: Mar. 26, 2018

(65) Prior Publication Data

US 2018/0284720 A1 Oct. 4, 2018

(30) Foreign Application Priority Data

Mar. 31, 2017 (JP) ................. 2017-070412

(51) Int. Cl.
*G05B 19/4063* (2006.01)
*G05B 19/404* (2006.01)
*G05B 19/18* (2006.01)

(52) U.S. Cl.
CPC ....... *G05B 19/4063* (2013.01); *G05B 19/186* (2013.01); *G05B 19/404* (2013.01); *G05B 2219/37226* (2013.01); *G05B 2219/43116* (2013.01)

(58) Field of Classification Search
USPC ................................. 700/160, 173
See application file for complete search history.

(56) References Cited

U.S. PATENT DOCUMENTS

| 2002/0180394 | A1 | 12/2002 | Matsumoto et al. |
| 2010/0030366 | A1* | 2/2010 | Scherer ............. G05B 19/4163 700/173 |
| 2017/0153629 | A1 | 6/2017 | Uno |
| 2017/0300030 | A1 | 10/2017 | Uno |

FOREIGN PATENT DOCUMENTS

| JP | 2002323915 A | 11/2002 |
| JP | 2005205517 A | 8/2005 |
| JP | 2010020704 A | 1/2010 |
| JP | 2017-097701 A | 6/2017 |
| JP | 2017-191536 A | 10/2017 |

OTHER PUBLICATIONS

Notification of Reasons for Refusal for Japanese Application No. 2017-070412, dated Oct. 30, 2018, with translation, 5 pages.

* cited by examiner

*Primary Examiner* — Michael J Brown
(74) *Attorney, Agent, or Firm* — RatnerPrestia

(57) ABSTRACT

A numerical controller can suppress overshoot in adaptive control and includes a speed calculation unit and a spindle load correction unit. The speed calculation unit performs PID control to adjust a feeding speed based on a spindle load measured by a measurement unit. The spindle load correction unit corrects the spindle load so as to have a value close to a target load until the spindle load reaches the target load. The speed calculation unit performs PID control using the corrected spindle load.

3 Claims, 10 Drawing Sheets

FIG. 1
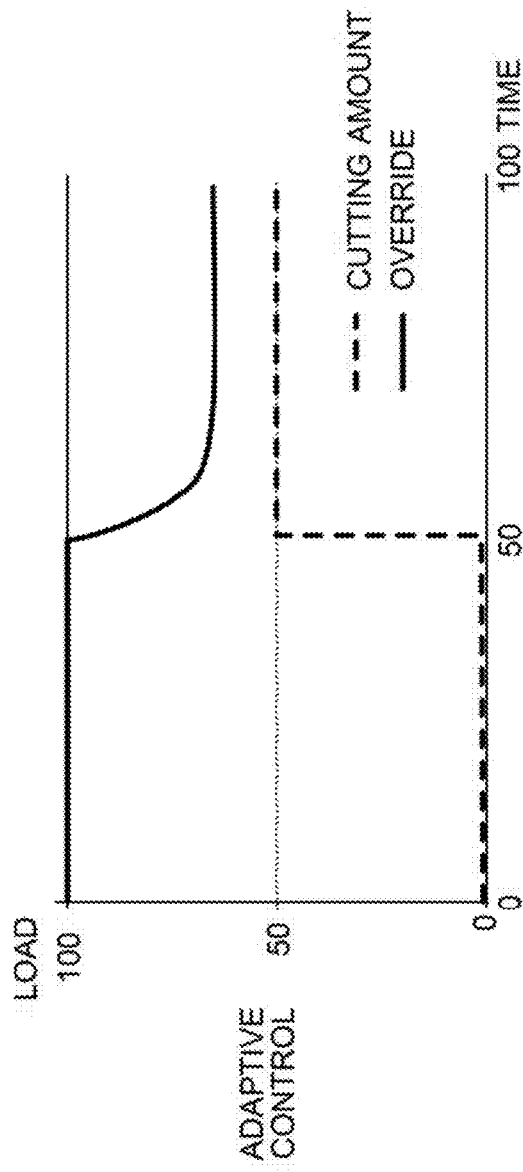
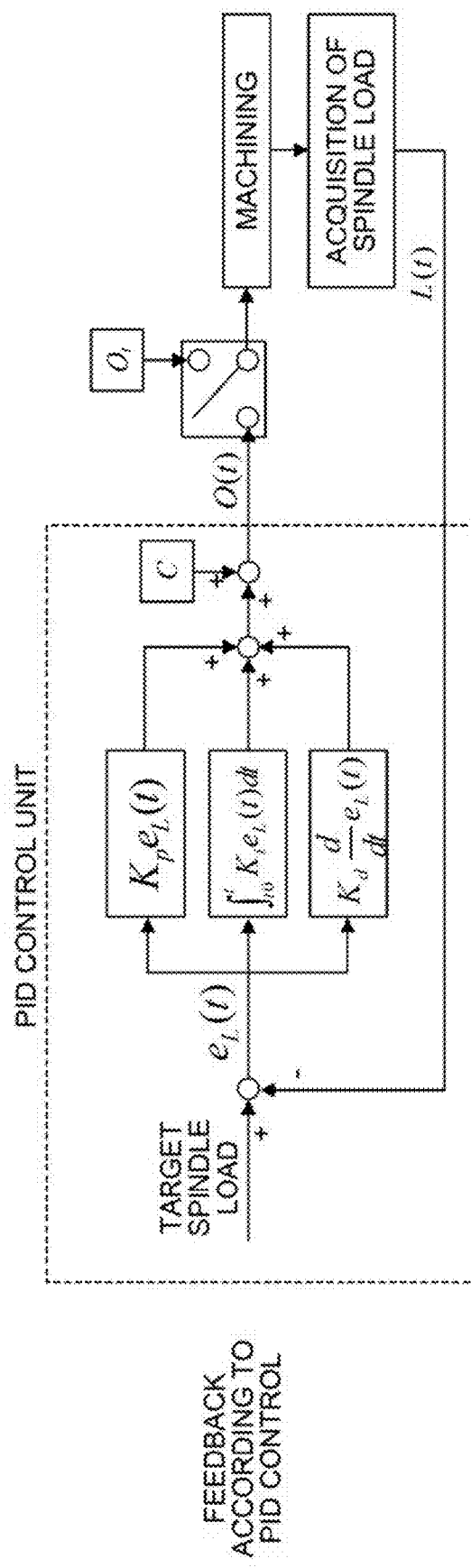

$$e'_L(t) = [\text{TARGET LOAD}] - F(t)$$
$$O(t) = K_p e'_L(t) + \int^t K_i e'_L(t)dt + K_d \frac{d}{dt}e'_L(t) + C$$

$$F(t) = \frac{\int_{t_0}^{t} R(t)dt}{\int_{t_0}^{t} C(t)dt}$$

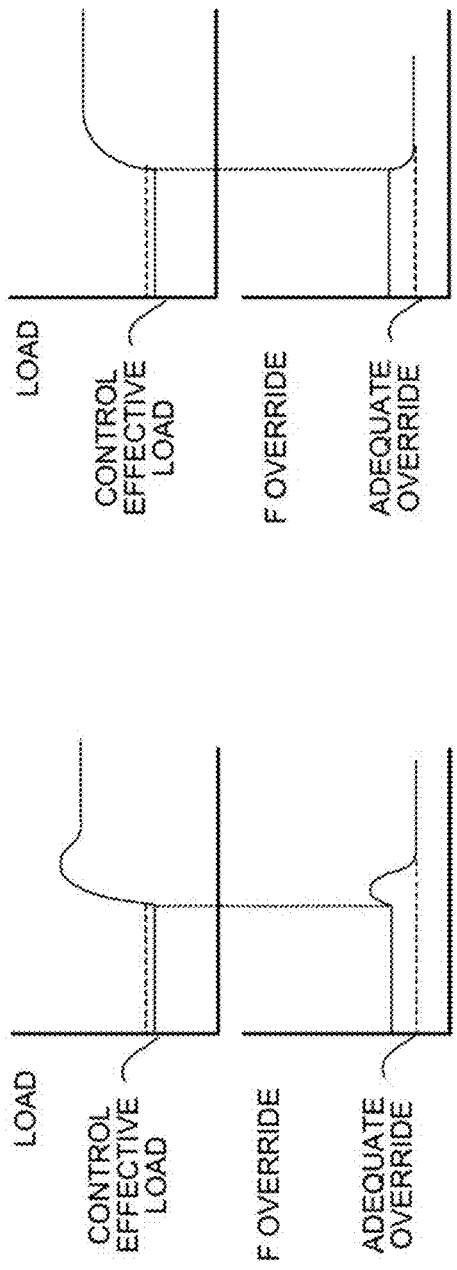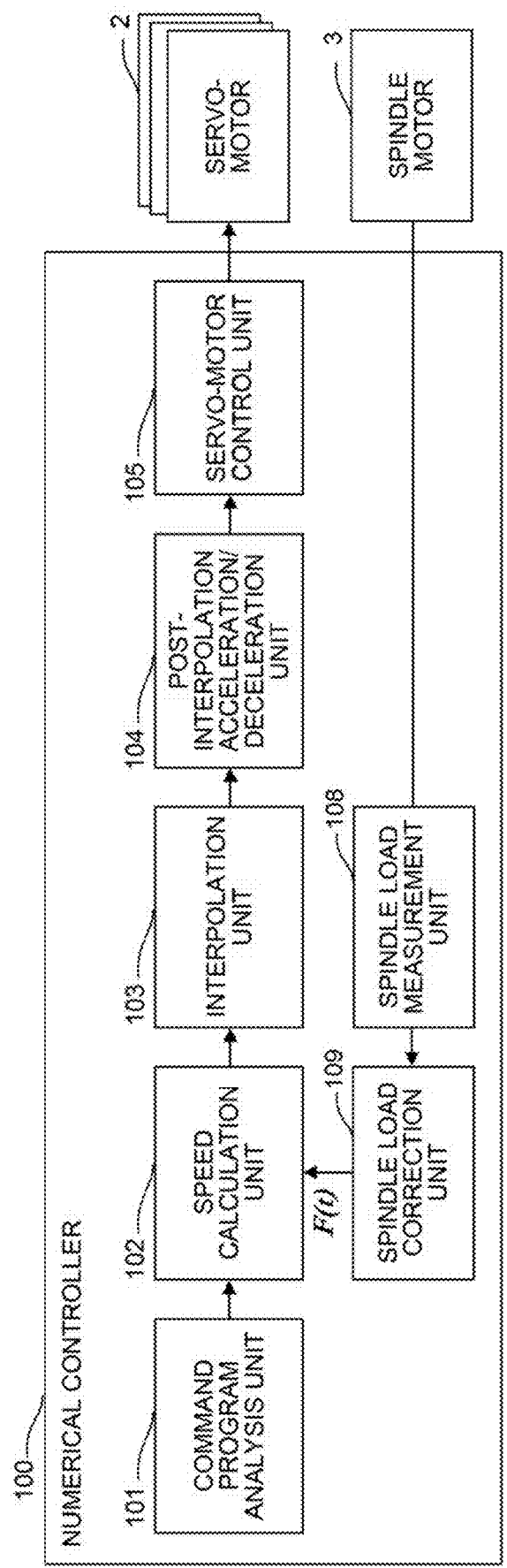

$$F(t) = \frac{R(t)dt}{C(t)dt}$$

$$\left( P(t_i) \geq \frac{D}{2} \right)$$

VOLUME CUT WITHIN MINUTE TIME IS PROPORTIONAL TO LENGTH OF DOTTED LINE. SINCE LENGTH WHEN DIAMETER ENGAGES IS SET TO 1, C($t_i$) IS GIVEN AS FOLLOW.

$$C(t_i) = \frac{2\sqrt{\left(\frac{D}{2}\right)^2 - \left(\frac{D}{2} - P(t_i)\right)^2}}{D}$$

NUMERICAL CONTROLLER

CROSS-REFERENCE TO RELATED APPLICATION

This application is a new U.S. Patent Application that claims benefit of Japanese Patent Application No. 2017-070412, filed Mar. 31, 2017, the disclosure of this application is being incorporated herein by reference in its entirety for all purposes.

BACKGROUND OF THE INVENTION

1. Field of the Invention

The present invention relates to a numerical controller, and particularly to a technique of suppressing overshoot in adaptive control.

2. Description of the Related Art

An adaptive control technique of detecting a load of a spindle and controlling a feeding speed has been known. For example, Japanese Patent Application Laid-Open No. 2017-97701 and Japanese Patent Application Laid-Open No. 2017-191536 disclose a technique of performing control such that a feeding speed is increased when a cutting amount is small and a spindle load is small, and the feeding speed is decreased when a cutting amount is large and the spindle load is large as illustrated in FIG. 1.

However, there is a problem that overshoot occurs when PID control is performed based on a low load at the start of cutting in the case of performing adaptive control according to the spindle load at the time of cutting into a workpiece. That is, the spindle load remains at a relatively low level until a contact area between a workpiece 11 and a tool 12 becomes maximum after the tool 12 starts contacting the workpiece 11 as illustrated in FIG. 2A. If the PID control is performed based on the low load at this time, the control to increase the speed is performed so that the spindle load overshoots as illustrated in FIG. 2B.

FIGS. 3 and 4 illustrate a generation mechanism of such a problem. As illustrated in FIG. 3, an override O(t), which is a determinant of the feeding speed of the spindle, is calculated by the following Formula (1) in the PID control. Here, the first term on the right side of Formula (1) is referred to as a proportional term, the second term is referred to as an integral term, and the third term is referred to as a differential term.

$$O(t) = K_p e_L(t) + \int^t K_i e_L(t)dt + K_d \frac{d}{dt}e_L(t) + C \quad (1)$$

The spindle load at the start of cutting indicates a serrated waveform like a graph in a block 20 of FIG. 3. A graph in a block 30 of FIG. 3 is obtained by smoothing such waveform data. As is apparent from the graph in the block 30, the spindle load is smaller than a target load at the start of cutting. In other words, a deviation $e_L(t)$ between the target load and the spindle load is large. In this case, the integral term on the right side of the above Formula (1) becomes large. The override O(t) increases as the integral term increases, and the control to increase the speed is performed, and as a result, overshoot in which the spindle load exceeds the target load occurs.

FIG. 5 is a graph illustrating an example of a transition of the spindle load (one-dot chain line) and the feeding speed (solid line) when the overshoot occurs.

In FIG. 5, the feeding speed is expressed by a magnification (%) with respect to a command speed, and the spindle load is expressed by a magnification (%) with respect to a continuous rating (a load that can be operated for a long time). In the example illustrated in FIG. 5, the PID control is performed using a short-time rating (a load that enables the operation only for a certain period of time), which corresponds to 200% of the continuous rating, as the target load. However, control in which the feeding speed exceeds 100% is performed because the spindle load at the start of the control is low, and as a result, the overshoot in which the spindle load exceeds the target load occurs.

Incidentally, it is possible to suppress the overshoot by increasing a gain (Kp) of the proportional term on the right side of the above Formula (1). However, such a countermeasure causes a new problem that the override decreases so that a machining speed is delayed, and thus, it is difficult to say that this countermeasure is appropriate.

SUMMARY OF THE INVENTION

The invention has been made in order to solve the above problems, and an object thereof is to provide a numerical controller capable of suppressing overshoot in adaptive control.

A numerical controller according to the invention includes: a spindle load measurement unit that measures a spindle load; a speed calculation unit that performs PID control to adjust a feeding speed based on the spindle load; and a spindle load correction unit that corrects the spindle load so as to have a value close to a target load until the spindle load reaches the target load. The speed calculation unit is configured to perform the PID control using the corrected spindle load.

The spindle load correction unit may be configured to correct the spindle load based on a cutting volume.

The spindle load correction unit may be configured to correct the spindle load based on a ratio between a length of a chord of an arc, which indicates a contact surface between a tool and a workpiece, and a diameter of the tool.

According to the invention, it is possible to provide the numerical controller capable of suppressing the overshoot in the adaptive control.

BRIEF DESCRIPTION OF THE DRAWINGS

FIG. 1 is a diagram illustrating a graph of an example of conventional PID control;

FIGS. 8A and 8B are graphs for describing that overshoot of a spindle load occurs in the conventional PID control (FIG. 8A), but no overshoot occurs in the PID control (FIG. 8B) according to the embodiment;

FIG. 9 is a block diagram illustrating a configuration of a numerical controller according to the embodiment of the invention;

DETAILED DESCRIPTION OF THE PREFERRED EMBODIMENTS

First, an overview of an embodiment of the invention will be described with reference to FIGS. 6A to 8.

In the embodiment, control is performed to correct feedback with a ratio between a cutting volume of a workpiece by a tool and an instantaneous value of a spindle load based on the conventional PID control as expressed in the above Formula (1). In this case, the cutting volume is obtained using a tool diameter and a feeding speed. In addition, it is known that the instantaneous value of the spindle load is substantially proportional to an instantaneous cutting volume. Accordingly, it is possible to resolve a smallness of feedback at the start of cutting by feeding back a value based on the ratio between the spindle load and the cutting volume instead of directly using the spindle load.

A feedback F(t) is obtained, for example, from the following Formula (2). Here, R(t) is an instantaneous value of the spindle load at time t. In addition, a denominator on the right side of Formula (2) represents a cutting volume from the start of cutting to time t (see FIG. 6A).

$$F(t) = \frac{\int_{t_0}^{t} R(t)dt}{\int_{t_0}^{t} C(t)dt} \quad (2)$$

Figure 2B:
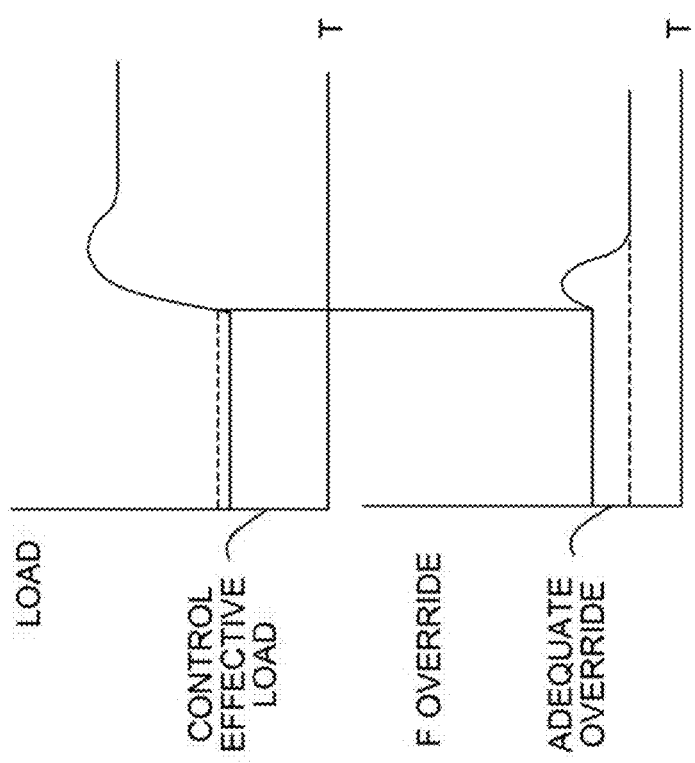
FIGS. 2A and 2B are diagrams for describing a problem of the related art.
Figure 2A:
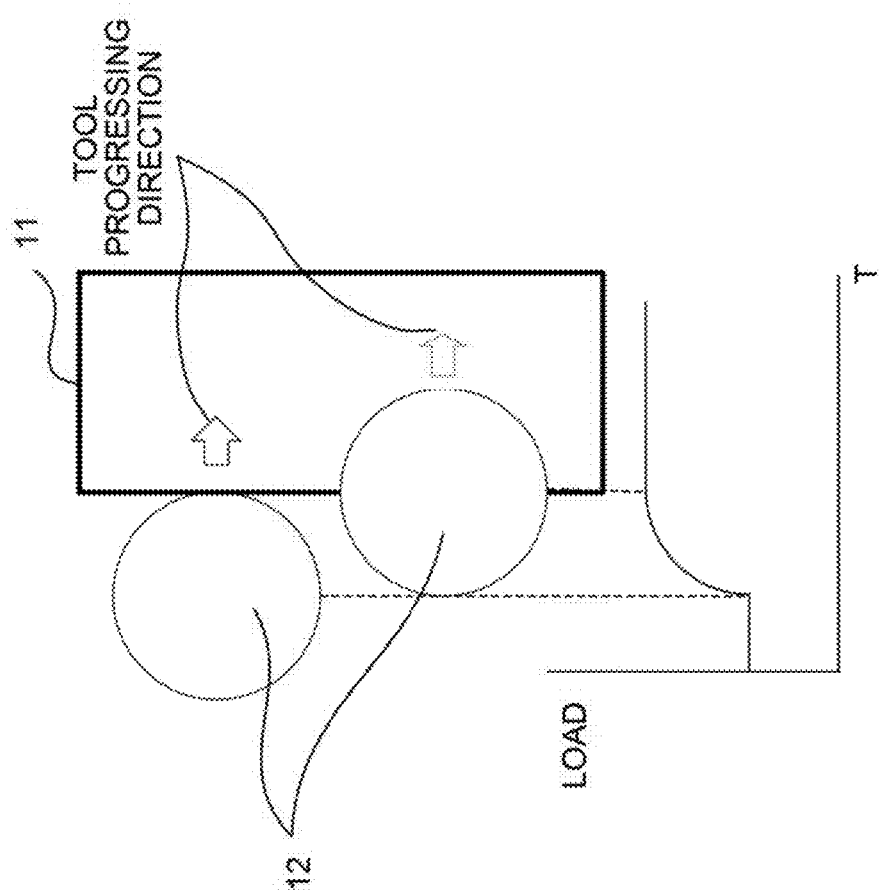
Figure 3:
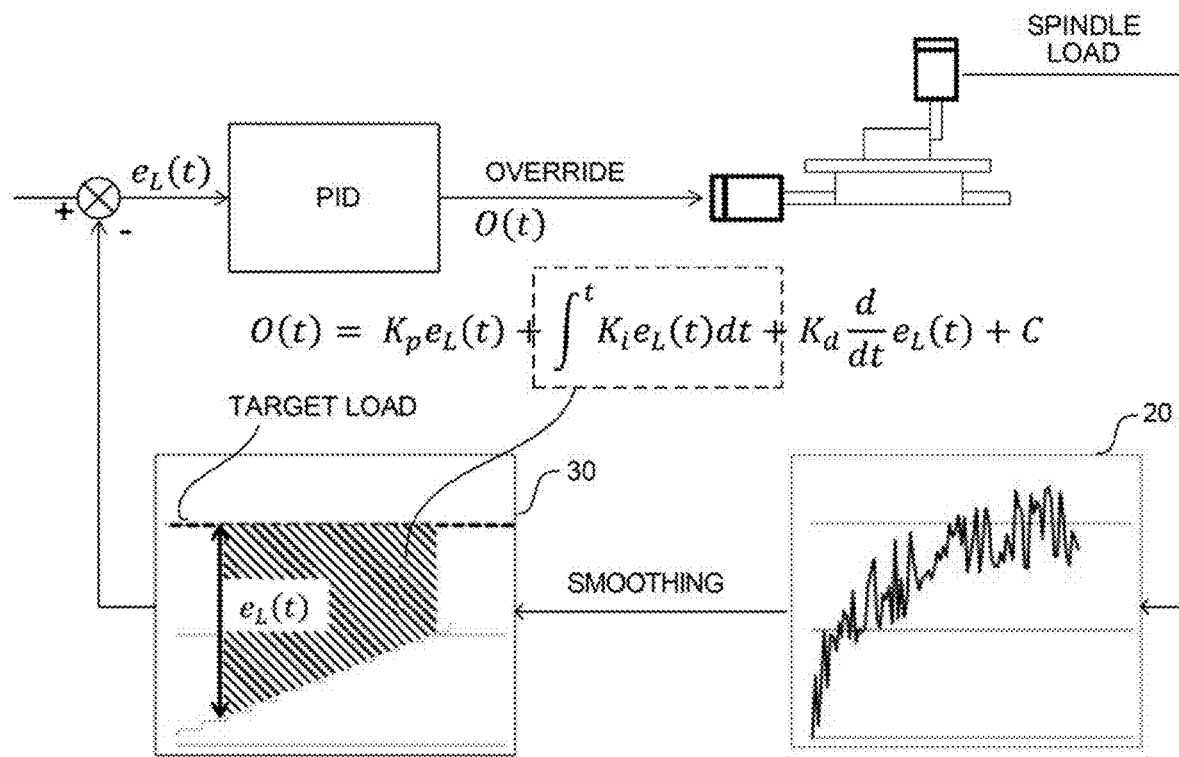
FIG. 3 is a diagram for describing the problem of the related art.
Figure 4:
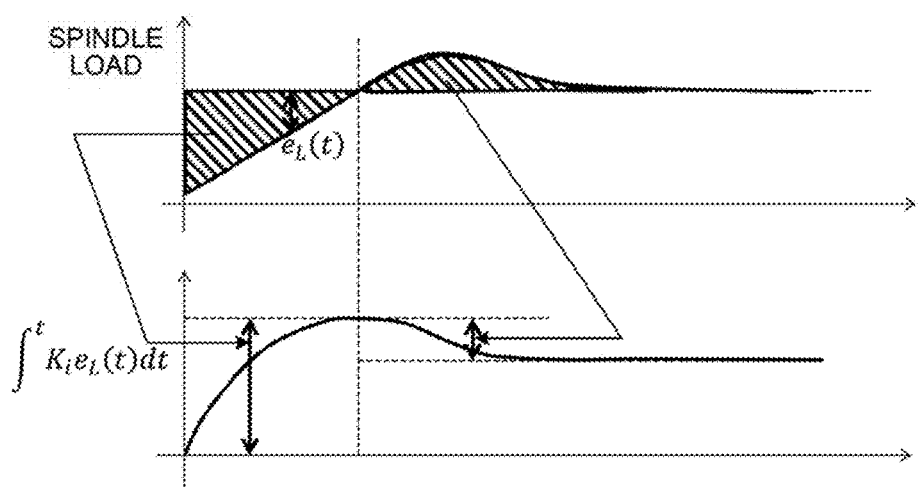
FIG. 4 is a graph for describing the problem of the related art.
Figure 5:
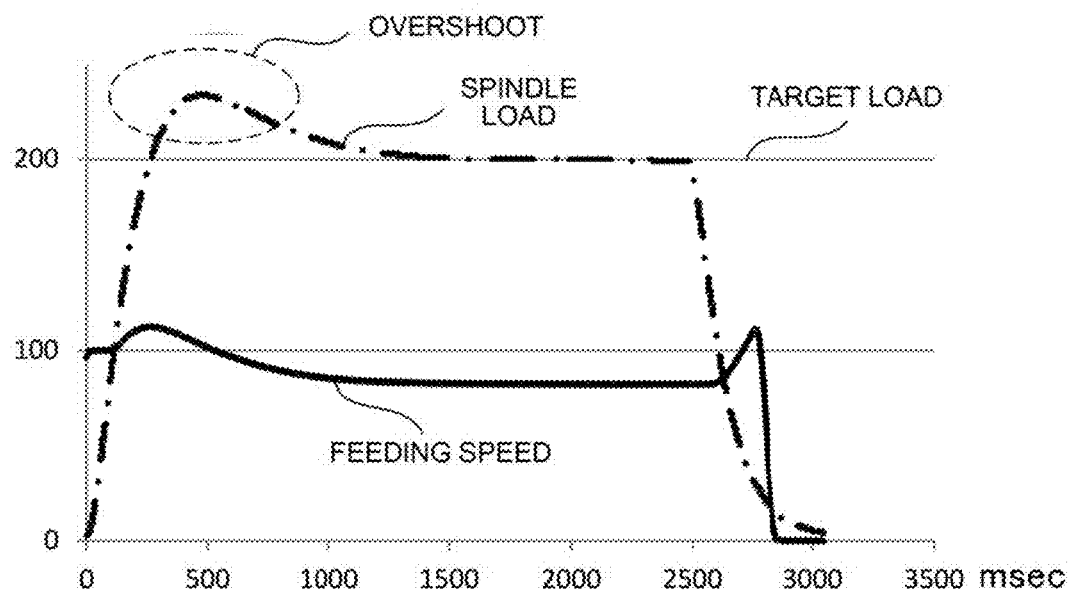
FIG. 5 is a graph for describing the problem of the related art.
Figure 6A:
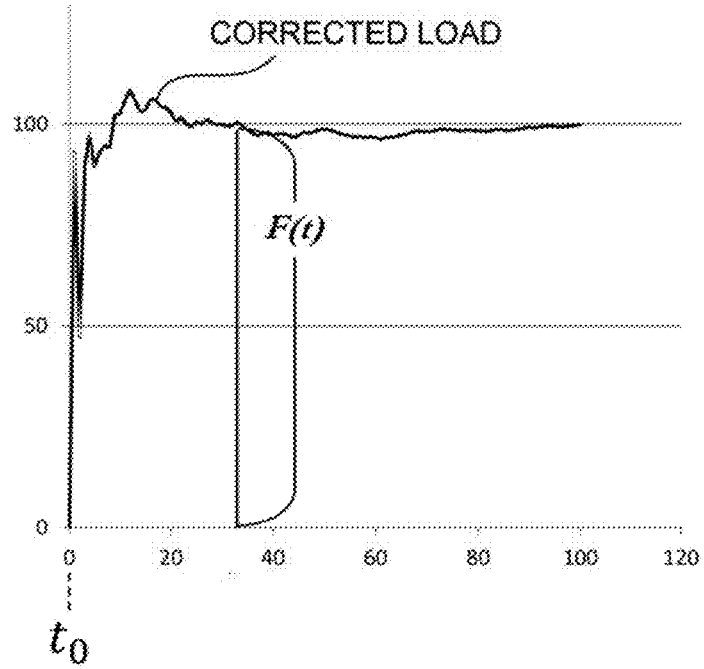
FIGS. 6A and 6B are graphs for describing an overview of PID control according to an embodiment of the invention.
Figure 6B:
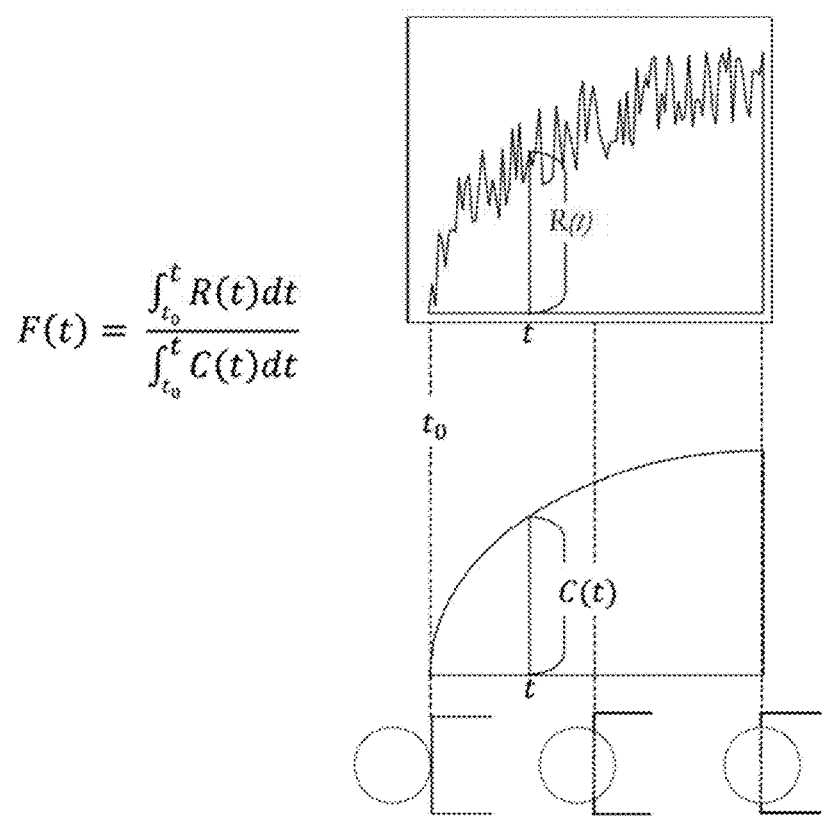

FIG. 6A is a graph illustrating transition of the feedback F(t) from a cutting start point. This graph indicates a magnification of a corrected spindle load (F(t)) when the target load is set to 100%. In the related art, a certain period of time is required until the spindle load reached the target load (see FIG. 3). Meanwhile, the time can be made substantially zero in the embodiment. In FIG. 6A, a value in vicinity of 50% appearing immediately after time $t_0$ is obtained due to noise.

Figure 7:
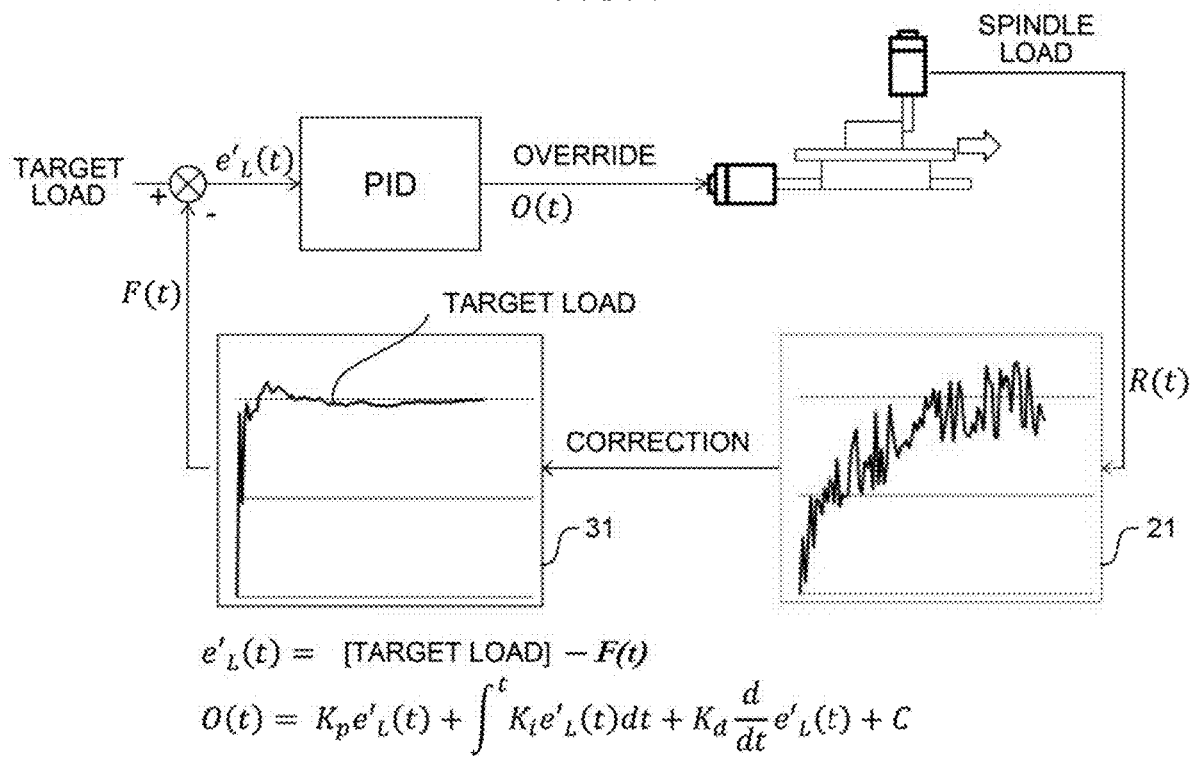
FIG. 7 is a diagram for describing the overview of the PID control according to the embodiment of the invention.

In this manner, as illustrated in FIG. 7, F(t) (a graph in a block 31 of FIG. 7) based on the ratio between the spindle load and the cutting volume is fed back in the embodiment instead of directly using the spindle load (a serrated graph in a block 21 in FIG. 7) as in the related art. This PID control is expressed by the following Formula (3).

$$e'_L(t) = [\text{target load}] - F(t) \quad (3)$$

-continued
$$O(t) = K_p e'_L(t) + \int^t K_i e'_L(t)dt + K_d \frac{d}{dt} e'_L(t) + C$$

As the feedback corrected in this manner is used for PID control, the feedback is not low even at the start of cutting. Thus, an integral term on the right side does not become large in the above Formula (3), and it is possible to prevent overshoot of the load.

Advantageous effects of the embodiment are described below using FIG. 8A and FIG. 8B.

Although the overshoot of the spindle load occurs in the conventional PID control illustrated in FIG. 8A, the overshoot does not occur in the PID control of the embodiment illustrated in FIG. 8B. That is, it is possible to perform more accurate control according to the embodiment as compared to the related art, and it is unnecessary to worry about overshoot. In other words, it is necessary, in the related art, to set the target load to be low in anticipation of overshoot, but it is unnecessary to do so if the embodiment is applied. Thus, it is possible to set the target load to be larger than that in the related art. The speed during cutting can be increased if the target load can be set to be large, so that it is possible to shorten machining time.

Next, a configuration of the numerical controller 100 according to the embodiment of the invention will be described using a block diagram of FIG. 9.

The numerical controller 100 includes a command program analysis unit 101, a speed calculation unit 102, an interpolation unit 103, a post-interpolation acceleration/deceleration unit 104, a spindle load measurement unit 108, and a spindle load correction unit 109.

The command program analysis unit 101 analyzes a command program to calculate a movement path and a movement speed of the tool. The speed calculation unit 102 executes the PID control based on the above Formula (3) using F(t) which is output from the spindle load correction unit 109 and obtained by correcting the spindle load with the cutting volume, and adjusts the feeding speed. The interpolation unit 103 performs interpolation processing of the movement path and the movement speed calculated by the speed calculation unit 102. The post-interpolation acceleration/deceleration unit 104 performs control to add acceleration/deceleration to the movement speed calculated by the speed calculation unit 102, for example, when a corner portion or the like is included in the movement path. A servo-motor control unit 105 controls a servo-motor 2 according to the movement path and the movement speed output from the interpolation unit 103 and the post-interpolation acceleration/deceleration unit 104, thereby moving the tool. The spindle load measurement unit 108 measures the spindle load based on an output of a sensor provided in a spindle motor 3 which is responsible for the rotation of the spindle. The spindle load correction unit 109 calculates F(t) obtained by correcting the spindle load detected by the spindle load measurement unit 108 with the cutting volume, and feeds back F(t) to the speed calculation unit 102.

In the conventional PID control, the spindle load output from the spindle load measurement unit 108 is used as the feedback. On the other hand, the speed calculation unit 102 of the numerical controller 100 according to the embodiment is characterized by feeding back F(t) obtained by correcting the spindle load with the cutting volume.

The flow of the operation of the numerical controller 100 will be described in more detail using a flowchart of FIG. 10.

The numerical controller 100 executes a process according to this flowchart at a predetermined execution period.

Step S1: A current spindle load R(t) measured by the spindle load measurement unit 108 is input to the spindle load correction unit 109 every period T. The spindle load correction unit 109 determines whether or not a relationship between R(t) and a threshold Rm is R(t)≥Rm. The threshold Rm is a lower limit value of the spindle load that enables the PID control. When R(t)≥Rm as a result of the determination, the process proceeds to Step S3. Otherwise, the process proceeds to Step S2.

Step S2: The spindle load correction unit 109 turns off a PID control flag, and ends the process.

Step S3: The spindle load correction unit 109 refers to the PID control flag and determines whether the PID control flag is turned on or not. The on-state of the PID control flag means that the PID control is currently being executed. When the PID control flag is in an off-state, the process proceeds to Step S4. Otherwise, the process proceeds to Step S6.

Step S4: The spindle load correction unit 109 sets time $t_0 = t - T$ based on a current time t and a PID control execution period (that is, an execution period of the spindle load correction unit 109 and the speed calculation unit 102) T.

Step S5: The spindle load correction unit 109 sets the PID control flag to the on-state.

Step S6: The spindle load correction unit 109 calculates F(t) which is obtained by correcting the spindle load with the cutting volume. When a discrete time of a control period is defined as $t_1 = t_0 + T$, $t_2 = t_0 + 2T$, . . . , and $t_n = t_0 + nT$ (n is a natural number), $F(t_n)$ is calculated by the following Formula (4).

$$F(t_n) = \frac{\sum_{i=1}^{n} R(t_i)}{\sum_{i=1}^{n} C(t_i)} \quad (4)$$

In the above Formula (4), $C(t_i)$ is a function that is proportional to the cutting volume per time when a rotary tool is fed in a direction perpendicular to the rotation axis with respect to a rectangular parallelepiped workpiece and cuts in perpendicularly to an end face of the workpiece. When the spindle load is corrected with an actual cutting volume per time, a difference between the spindle load and the target load becomes an inappropriate value. Thus, the spindle load is corrected using C (ti) representing a ratio (a ratio of a current cutting volume per time) which assumes a value when whole of the tool engages as 1. Then, $C(t_i)$ is expressed by the following Formula (5).

$$C(t_i) = \frac{\sqrt[2]{\left(\frac{D}{2}\right)^2 - \left(\frac{D}{2} - P(t_i)\right)^2}}{D} \quad (5)$$

Here, D is a tool diameter (mm), and $P(t_i)$ is a feeding amount (mm) from time $t_0$ to $t_i$.

Figure 11A:
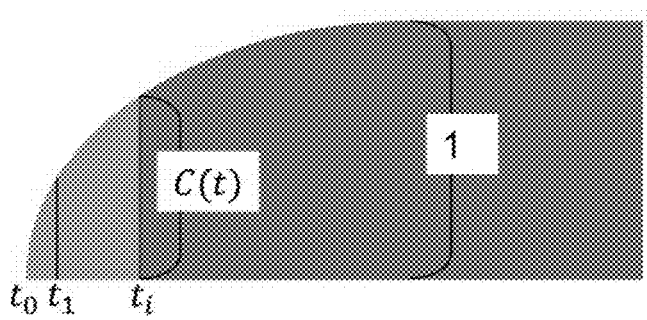
FIGS. 11A and 11B are views for describing an example of a method of correcting the spindle load.
Figure 11B:
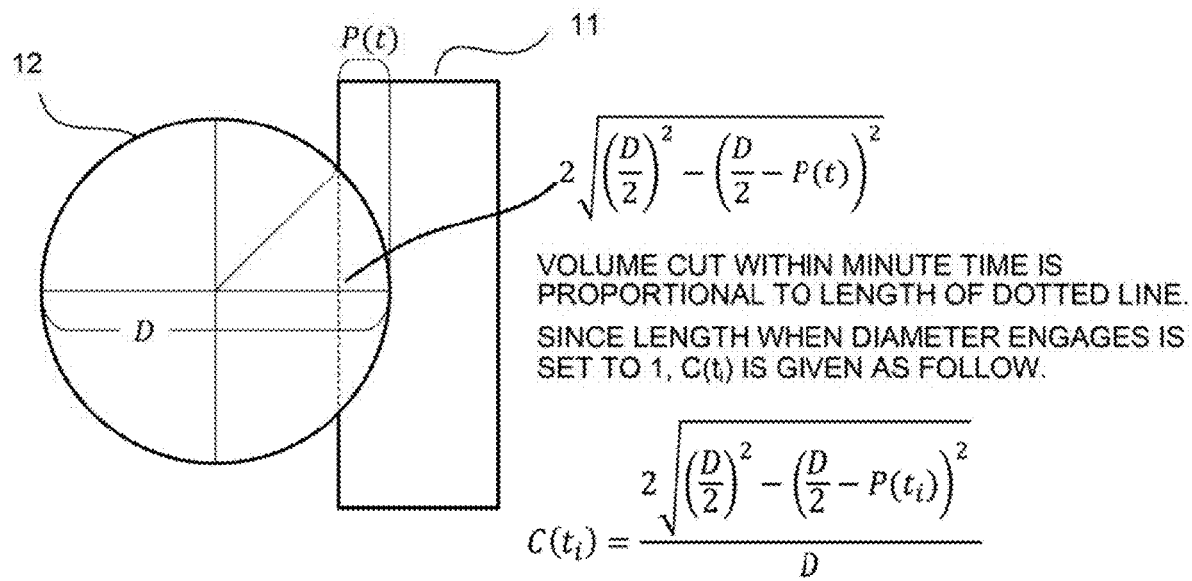

FIG. 11A and FIG. 11B illustrate a relationship among $C(t_i)$, D, and $P(t_i)$. FIG. 11B is a cross-sectional view of a state where the tool 12 cuts in the workpiece 11 as viewed from a direction of the rotation axis of the tool 12. A volume that the tool 12 cuts within a minute time is proportional to a length of a chord of an arc indicating a contact surface between the tool 12 and the workpiece 11 (indicated by the broken line in the FIG. 11B), which is expressed in Formula (6) below.

$$\sqrt[2]{\left(\frac{D}{2}\right)^2 - \left(\frac{D}{2} - P(t)\right)^2} . \quad (6)$$

In the embodiment, $C(t_i)$ is defined as in Formula (5) so as to be 1 when the length of the chord equals a diameter D. Incidentally, $C(t_i)$ is handled as 1 after $C(t_i)$ becomes 1, that is, when ti satisfies the following Formula (7).

$$\left(P(t_i) \geq \frac{D}{2}\right) \quad (7)$$

Step S7: The speed calculation unit 102 performs the PID control according to the above Formula (3) using F(t) fed back from the spindle load correction unit 109.

According to the embodiment, the spindle load correction unit 109 calculates F(t) obtained by correcting the spindle load with the cutting volume, and feeds back the calculated F(t) to the speed calculation unit 102, and the speed calculation unit 102 performs the PID control using F(t). That is, the spindle load correction unit 109 performs feedback by correcting the spindle load such that it has an appearance larger than the actual value thereof. As a result, a difference between the target load and a current spindle load can be made as small as possible, and it is possible to suppress occurrence of overshoot derived from the difference.

In addition, the feedback F(t) is reliably larger than R(t), and thus, appropriate correction can be performed even when a cutting width is not a width of the tool according to the embodiment.

Incidentally, the invention is not limited to the above-described embodiments and can be appropriately changed within a scope not departing from a spirit of the invention. The invention can modify arbitrary constituent elements of the embodiments or omit arbitrary constituent elements of the embodiments within the scope of the invention.

Figure 10:
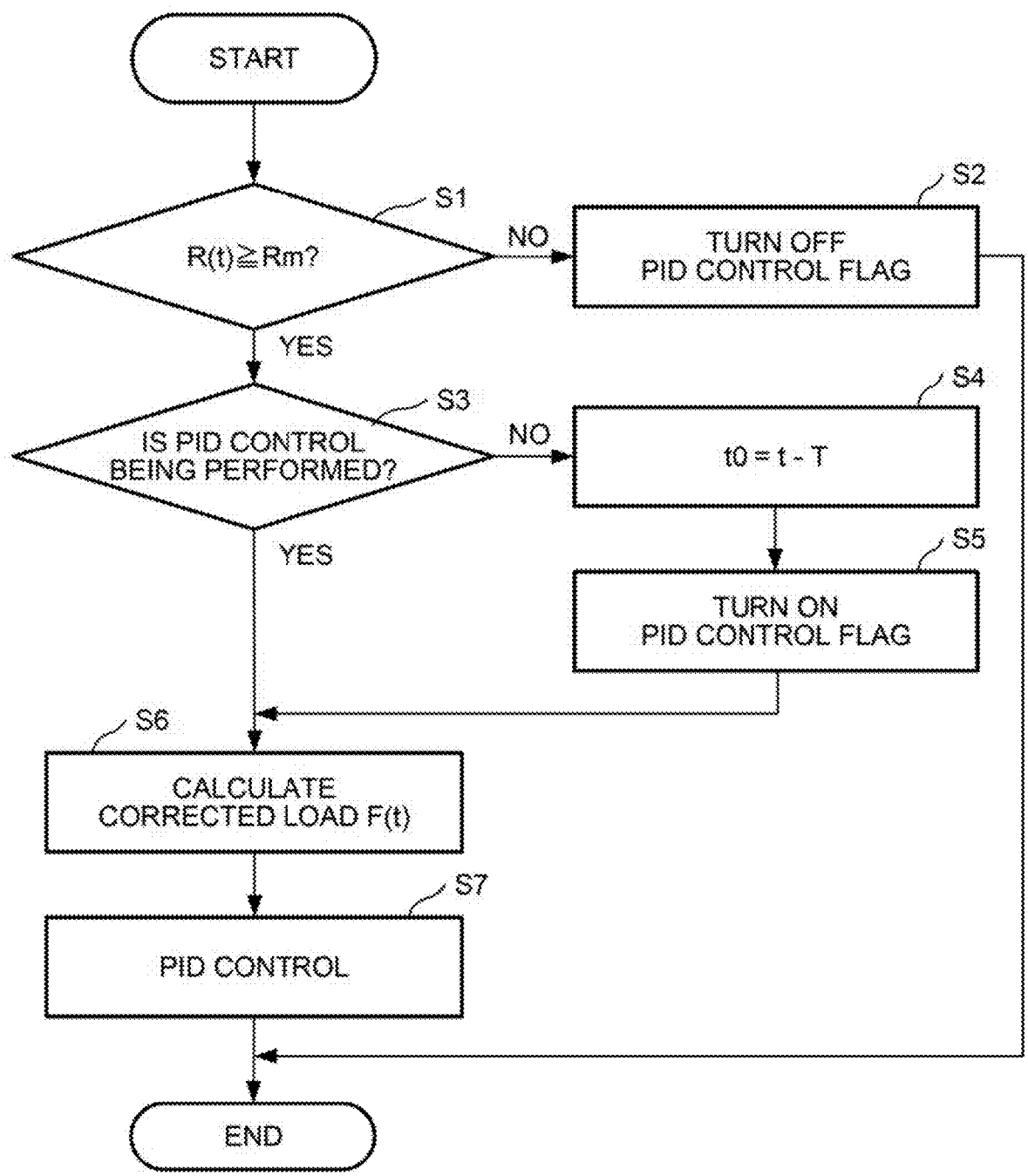
FIG. 10 is a flowchart illustrating an operation of the numerical controller according to the embodiment of the invention.

For example, $t_0 = t$ may be set in Step S1 of the flowchart of FIG. 10. Then, C(t)=0, and thus, it is difficult to output F(t) in such a period, but control is possible. In addition, if an acquisition period of R(t) is shorter than a control period, it is possible to more accurately obtain $t_0$ with the same procedure.

Figure 13A:
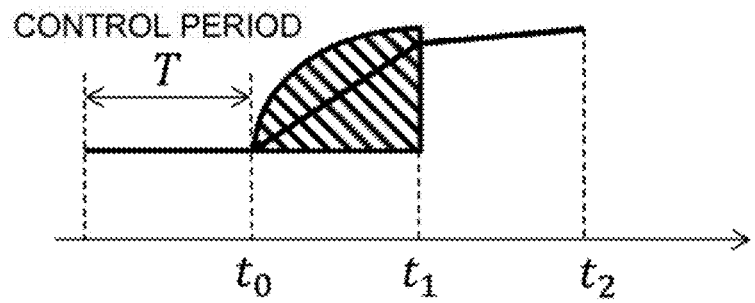
FIGS. 13A and 13B are graphs for describing an example of the method of correcting the spindle load.
Figure 13B:
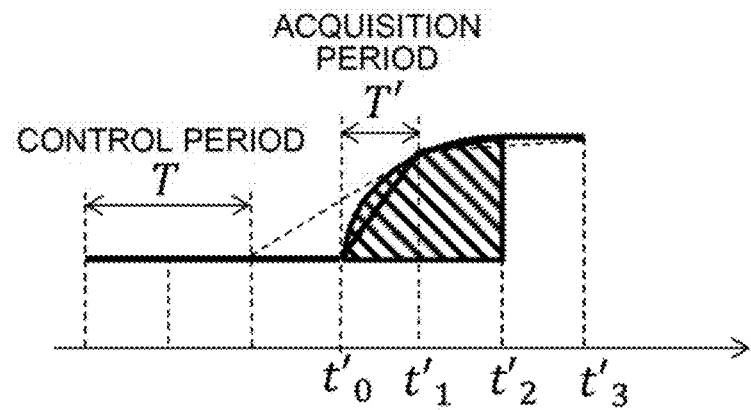

That is, when the acquisition period of the spindle load is smaller than the control period as illustrated in FIG. 13B, $t_i'$ is used for calculation. As a result, it is possible to more accurately synchronize the cutting volume and the load value than in the case where the acquisition period of the spindle load is equal to or longer than the control period as illustrated in FIG. 13A.

In addition, there is a possibility that a total discrete time, expressed in Formula (8) below $$\sum_{i=1}^{n} C(t_i), \quad (8)$$

may have lower accuracy depending on the execution period, the tool feeding speed, and the tool diameter. In this case, it is possible to increase the accuracy by directly obtaining the cutting volume by integration of $C(t_i)$ from the feeding amount.

Figure 14A:
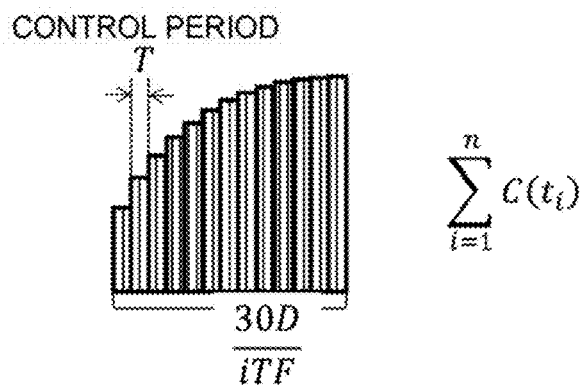
FIGS. 14A to 14C are views for describing an example of the method of correcting the spindle load.
Figure 14B:
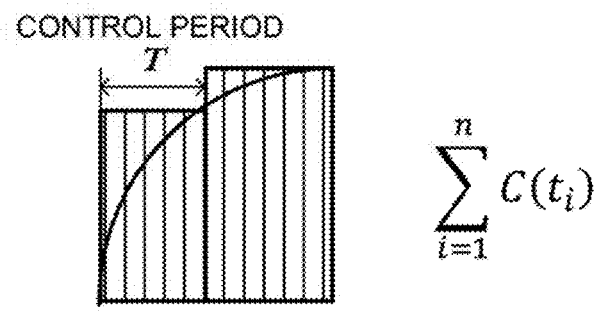
Figure 14C:
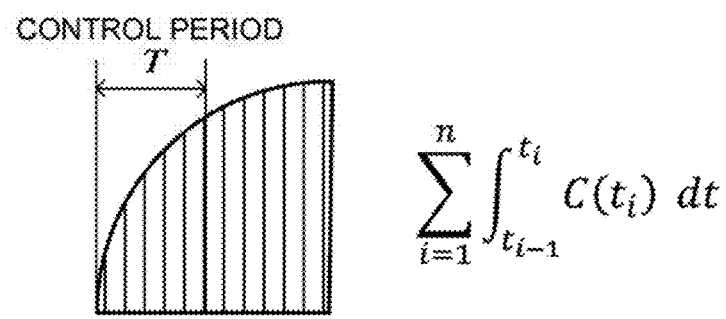

That is, a calculation error according to the above Formula (8) increases as the period T increases as illustrated in FIGS. 14A and 14B. In this case, the calculation accuracy can be secured if an integral value is directly obtained from the feed amount by the following Formula (9) as illustrated in FIG. 14C.

$$\sum_{i=1}^{n} \int_{t_{i-1}}^{t_i} C(t_i)dt \quad (9)$$

Figure 12A:
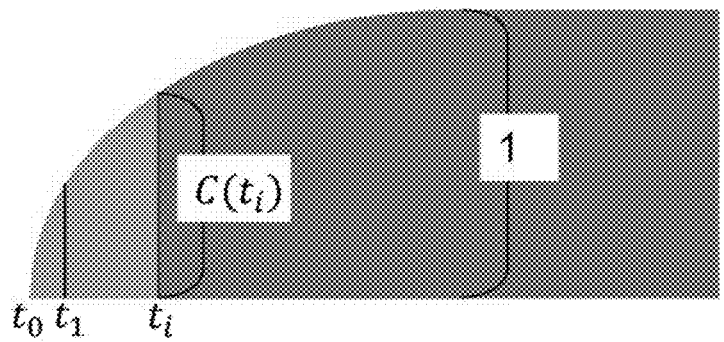
FIGS. 12A and 12B are views for describing an example of the method of correcting the spindle load.
Figure 12B:
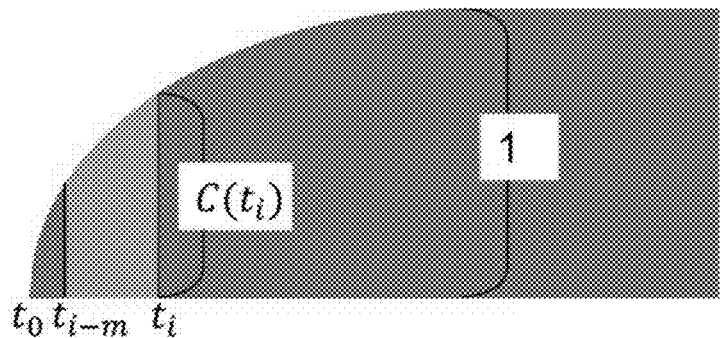

In addition, an integral interval is set from a control start time (see FIG. 12A) in the above-described embodiment, but the integration interval may be delimited at an arbitrary time. For example, there is no problem if an interval from $t_{i-m}$ to $t_i$ is used as the integral interval as illustrated in FIG. 12B. In that case, the integral intervals of both $C(t_i)$ and $R(t_i)$ need to be adjusted from $t_{i-m}$ to $t_i$.

Further, it is also possible to define $F(t_i)$ without calculating the integral, as in the following Formula (10). However, $F(t_i)$ fluctuates under the influence of noise if $F(t_i)$ defined by Formula (10) is directly used, and thus, the noise is removed using the integration in the above-described embodiment.

$$F(t) = \frac{R(t)dt}{C(t)dt} \quad (10)$$

In addition, it is also possible to apply some filters to R(t) and C(t). In this case, it is possible to calculate F(t) similarly to the above-described embodiment if the same filter is applied to R(t) and C(t).

Figure 15A:
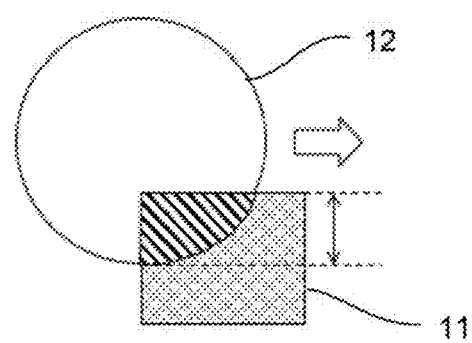
FIGS. 15A and 15B are views for describing an example of the method of correcting the spindle load.
Figure 15B:
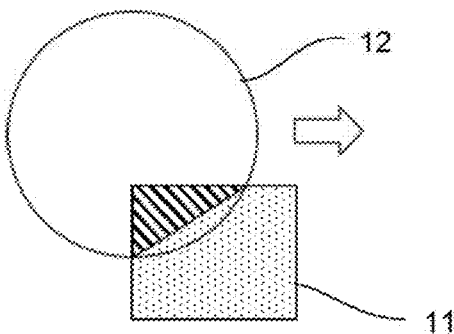

In addition, it is possible to calculate the cutting volume in the case of simple cutting if the cutting width is known (see a hatched part in FIG. 15A). Accordingly, it is also possible to enable setting of the cutting width. Incidentally, an approximate cutting volume (a triangle indicated with hatching) as illustrated in FIG. 15B may be calculated as the cutting volume for the sake of simplicity.

The invention claimed is:

1. A numerical controller comprising:
a spindle load measurement unit that measures a spindle load;
a speed calculation unit that performs PID control to adjust a feeding speed based on the spindle load; and
a spindle load correction unit that calculates a value based on a ratio between the spindle load and a cutting volume as a feedback value,
wherein the speed calculation unit is configured to perform the PID control using the feedback value.

2. The numerical controller according to claim 1, wherein the spindle load correction unit is configured to calculate the feedback value by using a ratio between a length of a chord of an arc, which indicates a contact surface between a tool and a workpiece, and a diameter of the tool.

3. A numerical controller comprising:
a spindle load measurement unit that measures a spindle load;
a speed calculation unit that performs PID control to adjust a feeding speed based on the spindle load; and
a spindle load correction unit that corrects the spindle load so as to have a value close to a target load until the spindle load reaches the target load,
wherein the speed calculation unit is configured to perform the PID control using the corrected spindle load, and wherein
the spindle load correction unit is configured to correct the spindle load based on a ratio between a length of a chord of an arc, which indicates a contact surface between a tool and a workpiece, and a diameter of the tool.

* * * * *